US011975301B2

(12) United States Patent
Casey et al.

(10) Patent No.: US 11,975,301 B2
(45) Date of Patent: May 7, 2024

(54) METHOD OF PRODUCING NANOPARTICLES

(71) Applicant: DOW SILICONES CORPORATION, Midland, MI (US)

(72) Inventors: James Allen Casey, Midland, MI (US); Charles Serrano, Midland, MI (US); David Lawrence Witker, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 317 days.

(21) Appl. No.: 17/598,252

(22) PCT Filed: Mar. 30, 2020

(86) PCT No.: PCT/US2020/025692
§ 371 (c)(1),
(2) Date: Sep. 25, 2021

(87) PCT Pub. No.: WO2020/205722
PCT Pub. Date: Oct. 8, 2020

(65) Prior Publication Data

US 2022/0176333 A1 Jun. 9, 2022

Related U.S. Application Data

(60) Provisional application No. 62/827,025, filed on Mar. 30, 2019.

(51) Int. Cl.
*B01J 13/00* (2006.01)
*B01J 2/02* (2006.01)
(Continued)

(52) U.S. Cl.
CPC ............. *B01J 13/0095* (2013.01); *B01J 2/02* (2013.01); *C01B 33/027* (2013.01); *B82Y 40/00* (2013.01); *C01P 2004/64* (2013.01)

(58) Field of Classification Search
CPC .. B01J 13/0004; B01J 13/003; B01J 13/0095; B01J 2/02; B01J 2/06
See application file for complete search history.

(56) References Cited

U.S. PATENT DOCUMENTS 7,446,335 B2 11/2008 Kortshagen et al.
8,016,944 B2 9/2011 Kortshagen et al.
(Continued)

FOREIGN PATENT DOCUMENTS

CN 1559662 A 1/2005
CN 101421056 A 4/2009
(Continued)

OTHER PUBLICATIONS

International Search Report for PCT/US2020/025692 dated Jun. 29, 2020, 5 pages.
(Continued)

*Primary Examiner* — Thu Khanh T. Nguyen
(74) *Attorney, Agent, or Firm* — Warner Norcross + Judd LLP

(57) ABSTRACT

Disclosed is a method for preparing a nanoparticle composition. The method includes forming a nanoparticle aerosol in a low pressure reactor, wherein the aerosol comprises MX-functional nanoparticles entrained in a gas, where M is an independently selected Group IV element and X is a functional group independently selected from H and a halogen atom. The method further includes collecting the MX-functional nanoparticles of the aerosol in a capture fluid, where the capture fluid is in fluid communication with the low pressure reactor. The capture fluid includes a polar aprotic fluid immiscible with water and having a viscosity of from 5 to 200 centipoise at 25° C. The capture fluid further includes a functionalization compound miscible with the polar aprotic fluid, the functionalization compound compris-
(Continued)

ing a functional group Y reactive with the functional group X of the MX-functional nanoparticles.

16 Claims, 4 Drawing Sheets

(51) Int. Cl.
*C01B 33/027* (2006.01)
*B82Y 40/00* (2011.01)

(56) References Cited

U.S. PATENT DOCUMENTS

| | | | |
|---|---|---|---|
| 2003/0180235 | A1 | 9/2003 | Grisoni et al. |
| 2004/0042950 | A1 | 3/2004 | Mleczko et al. |
| 2005/0093012 | A1 | 5/2005 | Bailey, III et al. |
| 2010/0197484 | A1 | 8/2010 | Sala et al. |
| 2012/0326089 | A1 | 12/2012 | Anderson et al. |
| 2013/0189446 | A1 | 7/2013 | Casey et al. |
| 2015/0147257 | A1 | 5/2015 | Anderson et al. |
| 2015/0307776 | A1 | 10/2015 | Casey et al. |
| 2015/0352210 | A1 | 12/2015 | Wang et al. |

FOREIGN PATENT DOCUMENTS

| | | | |
|---|---|---|---|
| CN | 101559946 | A | 10/2009 |
| CN | 104379247 | A | 2/2015 |
| IN | 105097485 | A | 11/2015 |
| JP | 2004359979 | A | 12/2004 |
| WO | 2014022388 | A1 | 2/2014 |
| WO | 2014186540 | A1 | 11/2014 |
| WO | 2014194181 | A1 | 12/2014 |
| WO | 2016191199 | A1 | 12/2016 |

OTHER PUBLICATIONS

Mangolini, L.; Thimsen, E.; Kortshagen, "High-Yield Plasma Synthesis of Luminescent Silicon Nanocrystals", U. Nano Lett. 2005, 5, 655-659.

Jurbergs, D.; Rogojina, E.; Mangolini, L.; Kortshagen, "Silicon nanocrystals with ensemble quantum yields exceeding 60%", U. Appl. Phys. Lett. 2006, 88, 233116.

Uwe Kortshagen, "Nonthermal plasma synthesis of semiconductor nanocrystals", J. Phys. D: Appl. Phys. 42 (2009) 113001 (22pp).

Pi, X. D.; Liptak, R. W.; S. A.; Kortshagen, "In-flight dry etching of plasma-synthesized silicon nanocrystals", U. Appl. Phys. Lett. 2007, 91, 083112.

Pi, X. D.; Liptak, R. W.; Deneen Nowak, J.; Wells, N. P.; Carter, C. B.; Campbell, S. A.; Kortshagen, "Air-stable full-visible-spectrum emission from silicon nanocrystals synthesized by an all-gas-phase plasma approach", U. Nanotechnology 2008, 19, 245603.

Holman, Z. C.; Kortshagen, "Nanocrystal Inks without Ligands: Stable Colloids of Bare Germanium Nanocrystals", U. R. Nano Lett. 2011, 11, 2133-2136.

Liptak, R. W.; Yang, J.; Kramer, N. J.; Kortshagen, "Environmental photostability of SF6-etched silicon nanocrystals", U.; Campbell, S. A. Nanotechnology 2012, 23, 395205.

Yasar-Inceoglu, O.; Lopez, T.; Farshihagro, E.; Mangolini, L., "Silicon nanocrystal production through non-thermal plasma synthesis: a comparative study between silicon tetrachloride and silane precursors", Nanotechnology 2012, 23, 25560.

Wheeler, L. M.; Neale, N. R.; Chen, T.; Kortshagen, "Hypervalent surface interactions for colloidal stability and doping of silicon nanocrystals", U. Nature Communications 2013, 4, 2197.

Machine assisted English translation of CN1559662A obtained from https://worldwide.espacenet.com/patent on Jun. 5, 2023, 14 pages.

Machine assisted English translation of CN105097485A obtained from https://worldwide.espacenet.com/patent on Jun. 5, 2023, 14 pages.

Machine assisted English translation of CN101559946A obtained from https://worldwide.espacenet.com/patent on Jun. 5, 2023, 13 pages.

Machine assisted English translation of JP2004359979A obtained from https://worldwide.espacenet.com/patent on Mar. 18, 2024, 7 pages.

METHOD OF PRODUCING NANOPARTICLES

CROSS-REFERENCE TO RELATED APPLICATIONS

This application is the U.S. National Stage of International Application No. PCT/US2020/025692 filed on 30 Mar. 2020, which claims priority to and all advantages of U.S. Provisional Patent Application No. 62/827,025 filed on 30 Mar. 2019, the content of which is incorporated herein by reference.

FIELD OF THE INVENTION

The disclosure generally relates to methods for producing nanoparticles and, more specifically, to methods of producing hydrophilic nanoparticles with a plasma reactor.

BACKGROUND

Nanoparticles are known in the art and can be prepared via various processes.

Nanoparticles are often defined as particles having at least one dimension of less than 100 nanometers. Nanoparticles are produced either from a bulk material, which is initially larger than a nanoparticle, or from particles smaller than the nanoparticles, such as ions and/or atoms. Nanoparticles are particularly unique in that they may have significantly different properties than a bulk material or smaller particles from which the nanoparticles are derived. For example, a bulk material that acts as an insulator or semiconductor may be, when in nanoparticle form, electrically conductive or photoluminescent.

An important characteristic of nanoparticles (<100 nm diameter) is that they photoluminesce visible light when excited by electromagnetic radiation at an excitation wavelength. Nanoparticles may be used in various applications including in optoelectronics, diagnostics, analytics, and cosmetics. Nanoparticles have additional physical characteristics that differ from a bulk material, such as melting points that vary as a function of particle diameter.

Nanoparticles may be produced via a plasma process. For example, nanoparticles may be produced in a plasma reactor from a precursor gas. In certain plasma processes, the nanoparticles produced in the plasma reactor are captured or deposited in a capture fluid. In various applications, the nanoparticles may undergo further reactions with target functionalization compounds dispersed within the capture fluid, where the further reactions include surface functionalization reactions.

BRIEF SUMMARY

The disclosure provides a method for preparing a nanoparticle composition. The method includes forming a nanoparticle aerosol in a low pressure reactor, wherein the aerosol comprises MX-functional nanoparticles entrained in a gas, where M is an independently selected Group IV element and X is a functional group independently selected from H and a halogen atom. The method further includes collecting the MX-functional nanoparticles of the aerosol in a capture fluid, where the capture fluid is in fluid communication with the low pressure reactor. The capture fluid includes a polar aprotic fluid immiscible with water and having a viscosity of from 5 to 200 centipoise at 25° C. The capture fluid further includes a functionalization compound miscible with the polar aprotic fluid, the functionalization compound comprising a functional group Y reactive with the functional group X of the MX-functional nanoparticles.

The disclosure further provides a nanoparticle composition formed in accordance with the method.

BRIEF DESCRIPTION OF THE DRAWINGS

Other advantages and aspects of this disclosure may be understood in view of the following detailed description when considered in connection with the accompanying drawings wherein.

DETAILED DESCRIPTION

Figure 1:
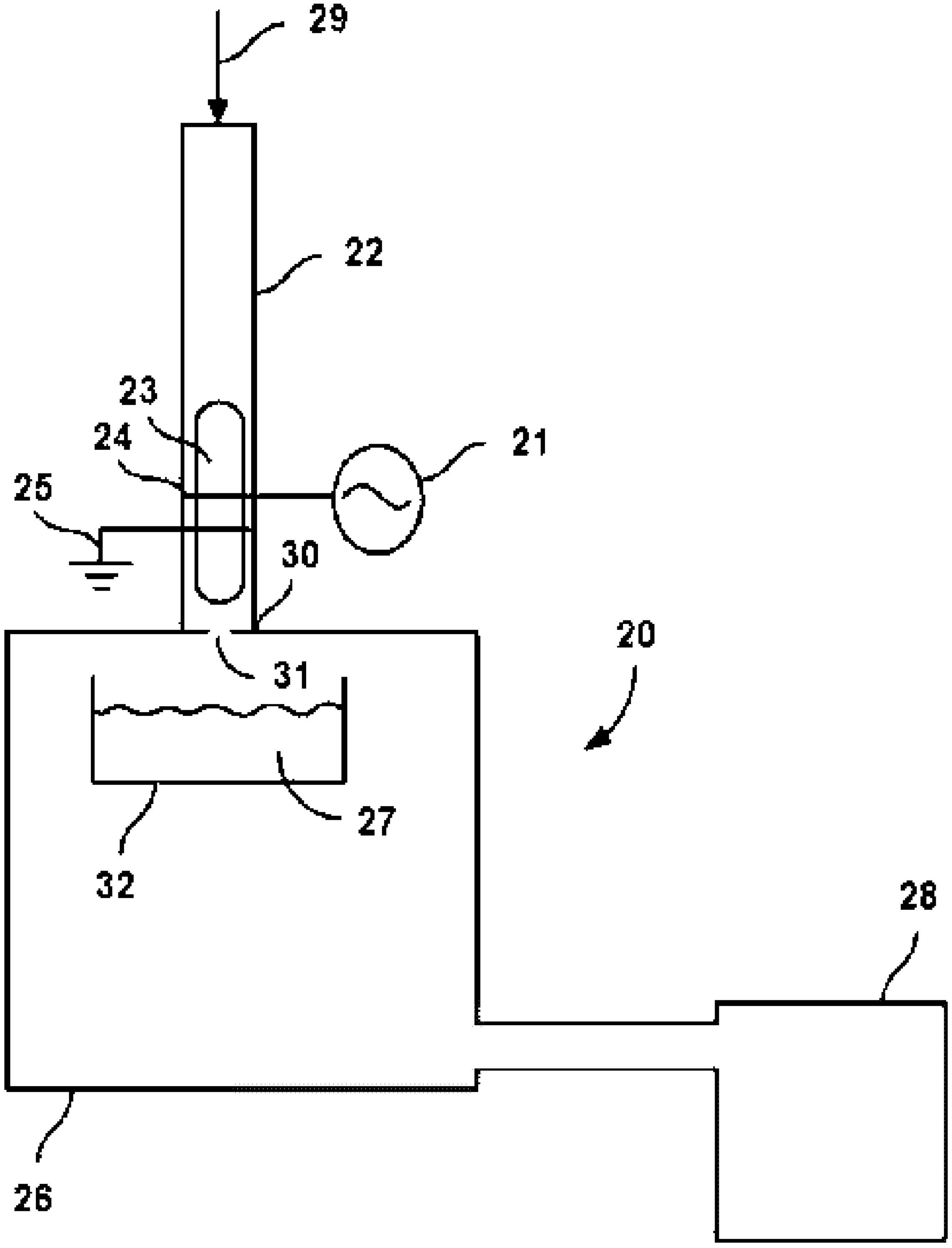
FIG. 1 illustrates one embodiment of a low pressure high frequency pulsed plasma reactor for producing nanoparticles.

The disclosure provides a method for preparing a nanoparticle composition. The method of the disclosure is particularly suitable for preparing a nanoparticle composition including nanoparticles produced via a plasma process, as described in greater detail infra.

The method comprises forming a nanoparticle aerosol in a low pressure reactor where the aerosol comprises MX-functional nanoparticles entrained in a gas, where M is an independently selected Group IV element and X is a functional group independently selected from H and a halogen atom. As used herein, group designations of the periodic table are generally from the CAS or old IUPAC nomenclature, although Group IV elements are referred to as Group 14 elements under the modern IUPAC system, as readily understood in the art. The method further comprises collecting the MX-functional nanoparticles of the aerosol in a capture fluid, where the capture fluid is in fluid communication with the plasma reactor. The capture fluid comprises a polar aprotic fluid immiscible with water. The capture fluid further comprises a functionalization compound miscible with the polar aprotic fluid, the functionalization compound comprising a functional group Y reactive with the functional group X of the MX-functional nanoparticles.

The method of the disclosure may be utilized in conjunction with various plasma reactor systems utilizing different plasma reactors. Specifically, the method of the instant disclosure may be utilized in any plasma reactor system which forms a nanoparticle aerosol, and which ultimately captures or collects MX-functional nanoparticles in a capture fluid. Exemplary plasma processes for the inventive method are described below.

Regardless of the particular plasma system and process utilized to produce the nanoparticles, the plasma system generally relies on a precursor gas. The precursor gas is generally selected based on the desired composition of the nanoparticles. For example, as introduced above, the nanoparticle aerosol comprises MX-functional nanoparticles, where M is an independently selected Group IV element.

To this end, the precursor gas utilized generally comprises M; i.e., the precursor gas generally comprises at least one of silicon, germanium and tin (which are Group IV elements). For example, when the MX-functional nanoparticles comprise SiX-functional nanoparticles, the precursor gas generally comprises silicon. In various embodiments, the precursor gas may be selected from silanes, disilanes, halogen-substituted silanes, halogen-substituted disilanes, $C_1$-$C_4$ alkyl silanes, $C_1$-$C_4$ alkyldisilanes, and mixtures thereof. In one form of the present disclosure, the precursor gas comprises a silicon precursor, such as a silane, which accounts for 0.1 to 2% by volume of a reactant gas mixture, which may alternatively be referred to as a gas mixture. Alternatively, the silicon precursor can comprise from 0.1% to 50% by volume of the reactant gas mixture. Generally, the precursor gas designates the reactive gas utilized to nucleate the nanoparticles, and the reactant gas mixture may include gasses, as described below, to form the gas mixture or reactant gas mixture that includes the silicon precursor gas. The gas mixture may also comprise other percentages of silane. The precursor gas may additionally or alternatively comprise $SiCl_4$, $HSiCl_3$, and $H_2SiCl_2$.

Alternatively, when the MX-functional nanoparticles comprise GeH-functional nanoparticles, the precursor gas generally comprises germanium. In this embodiment, the precursor gas may be selected from germane, digermanes, halogen-substituted germanes, halogen-substituted digermanes, $C_1$-$C_4$ alkyl germanes, $C_1$-$C_4$ alkyldigermanes, and mixtures thereof. The nanoparticles may comprise both silicon and germanium, or other mixtures of groups IV elements, with the precursor gas including combinations of the above precursor gasses.

Further, organometallic precursor molecules may also be used in or as the precursor gas. These molecules include a Group IV metal and independently selected organic groups. Organometallic Group IV precursors include, but are not limited to organosilicon, organogermanium and organotin compounds. Some examples of Group IV precursors include, but are not limited to, alkylgermaniums, alkylsilanes, alkylstannanes, chlorosilanes, chlorogermaniums, chlorostannanes, aromatic silanes, aromatic germaniums and aromatic stannanes. Other examples of silicon precursors include, but are not limited to, disilane ($Si_2H_6$), silicon tetrachloride ($SiCl_4$), trichlorosilane ($HSiCl_3$) and dichlorosilane ($H_2SiCl_2$). Still other suitable precursor molecules for use in forming crystalline silicon nanoparticles include alkyl and aromatic silanes, such as dimethylsilane ($H_3C—SiH_2—CH_3$), tetraethyl silane ($(CH_3CH_2)_4Si$) and diphenylsilane (Ph-$SiH_2$-Ph). Particular examples of germanium precursor molecules that may be used to form crystalline germanium nanoparticles include, but are not limited to, tetraethyl germane ($(CH_3CH_2)_4Ge$) and diphenylgermane (Ph-$GeH_2$-Ph).

The precursor gas may be mixed with other gases, such as a first inert gas, in the gas mixture or reactant gas mixture. Examples of the first inert gas include a noble gas consisting of elements selected from Group 18 of the periodic table, such as helium, neon, argon, krypton, xenon, and various mixtures thereof. The inert gas may alternatively include any gas non-reactive within any other species present within the plasma reactor. When present in the gas mixture, the first inert gas may be utilized in an amount of from 1 to 99 volume percent based on the total volume of the reactant gas mixture. The gas mixture may comprise the precursor gas in an amount of from 0.1 to 50, alternatively from 1 to 50, volume percent based on the total volume of the reactant gas mixture.

In these or other embodiments, the nanoparticles may undergo doping to become doped nanoparticles. For example, the nanoparticles may undergo gas phase doping in the plasma, where the precursor gas is a first precursor gas and a second precursor gas is dissociated and is incorporated in the nanoparticles as they nucleate. The nanoparticles may also or alternatively undergo doping in the gas phase downstream of the production of the nanoparticles, but before the nanoparticles are captured in the capture fluid. Furthermore, when the capture fluid is used to collect the nanoparticles, doped nanoparticles may be produced in the capture fluid where the dopant is preloaded therein, in which case the nanoparticles become doped in situ in the capture fluid. Doped nanoparticles can be formed by contact with organosilicon gases or liquids, including, but not limited to trimethylsilane, disilane, and trisilane. Gas phase dopants may include, but are not limited to, $BCl_3$, $B_2H_6$, $PH_3$, $GeH_4$, or $GeCl_4$.

In certain embodiments, the reactant gas mixture further comprises the second precursor gas, which itself can constitute from 0.1 to 49.9 volume % based on total volume of the reactant gas mixture. The second precursor gas may comprise $BCl_3$, $B_2H_6$, $PH_3$, $GeH_4$, or $GeCl_4$. The second precursor gas may also comprise other gases that contain carbon, germanium, boron, phosphorous, and/or nitrogen. The combination of the first precursor gas and the second precursor gas together may make up from 0.1 to 50 volume % based on the total volume of the reactant gas mixture.

In another form of the present disclosure, the reactant gas mixture further comprises hydrogen gas. Hydrogen gas can be present in an amount of from 1% to 50%, alternatively 1% to 25%, alternatively 1% to 10%, by volume based on total volume of the reactant gas mixture. However, it is also contemplated that the reactant gas mixture may comprise other percentages of hydrogen gas.

In these or other embodiments, the nanoparticles may comprise alloys of Group IV elements, e.g. silicon alloys. Silicon alloys that may be formed include, but are not limited to, silicon carbide, silicon germanium, silicon boron, silicon phosphorous, and silicon nitride. The silicon alloys may be formed by mixing at least one first precursor gas with the second precursor gas or using a precursor gas that contains the different elements. However, other methods of forming alloyed nanoparticles are also contemplated.

As set forth above, X of the MX-functional nanoparticles comprises a functional group independently elected from H and a halogen atom. The precursor gas (or gasses in the reactant gas mixture) is generally selected based on the desired functional group of the MX-functional nanoparticles. For example, when X is H, the reactant gas mixture generally comprises hydrogen gas or a lesser concentration of halogenated species (e.g. $SiCl_4$, $HSiCl_3$, $BCl_3$, $GeCl_4$, etc.). In contrast, when X is the halogen atom, the precursor gas (or reactant gas mixture) comprises halogenated species (e.g. $SiCl_4$, $HSiCl_3$, $BCl_3$, $GeCl_4$, etc.). Any of these chlorinated species may comprise halogen atoms other than chlorine, e.g. bromine, fluorine, or iodine. For example, $SiBr_4$ may be utilized in combination with or in lieu of $SiCl_4$ contingent on the desired functional group X. Further, in embodiments where the functional group X is a halogen atom, the reactant gas mixture may further comprise a halogen gas. For example, in embodiments where the functional group X is Cl, chlorine gas ($Cl_2$) may be utilized in the reactant gas mixture, either as a separate feed or along with the precursor gas. The relative amount of the halogen gas, if utilized, may be optimized based upon a variety of factors, such as the precursor gas selected, etc. For example, lesser amounts of the halogen gas may be required to prepare halogen-functional nanoparticles when the precursor gas comprises halogenated species. In certain embodiments, the halogen gas may be utilized in an amount of from greater than 0 to 25%, alternatively from 1% to 25%, alternatively from 1% to 10%, of the total volume of the reactant gas mixture.

In various embodiments, the plasma reactor is a component of a plasma system (alternatively referred to as a plasma reactor system). Specific embodiments of plasma reactor systems particularly suitable for the instant method are described below. It is to be appreciated that the specific embodiments described below are merely examples of exemplary plasma processes suitable for producing MX-functional nanoparticles.

Referring to FIG. 1, a plasma reactor system (alternatively referred to as a very high frequency low pressure plasma reactor system or as a low pressure high frequency plasma reactor system) is shown at 20. In this embodiment, the plasma reactor system 20 comprises a plasma generating chamber 22 (which may alternatively be referred to as a plasma reactor or as a discharge tube) having a reactant gas inlet 29 and an outlet 30 having an aperture or orifice 31 defined thereby. A particle collection chamber 26 (which may alternatively be referred to as a deposition chamber or a vacuum particle collection chamber) is configured to be in fluid communication with the plasma generating chamber 22. The particle collection chamber 26 contains a capture fluid 27 in a container 32. The container 32 or the capture fluid 27 may be adapted to be agitated (not shown). For example, the container 32 may be positioned on a rotatable support (not shown) or may include a stirring mechanism. Contemplated forms of agitation that are acceptable include stirring, rotation, inversion, and other suitable methods. Agitation of the capture fluid 27 is used to refresh a surface of the capture fluid 27 and to force captured nanoparticles away from a centerline of the orifice 32. If higher absorption rates of the nanoparticles into the capture fluid are desired, more intense forms of agitation may be used; for example, one method of such intense agitation may include ultrasonication. Typically, the capture fluid 27 is a liquid at the temperatures of operation of the plasma reactor system. The plasma reactor system 5 also includes a vacuum source 28 in fluid communication with the particle collection chamber 26 and plasma generating chamber 22.

The plasma generating chamber 22 includes an electrode configuration 24 that is attached to a variable radio frequency (RF) power amplifier 21. The plasma generating chamber 22 also comprises a second electrode configuration 25. The second electrode configuration 25 is either ground, DC biased, or operated in a push-pull manner relative to the electrode configuration 24. The electrode configurations 24, 25 are used to couple the high frequency (HF) or very high frequency (VHF) power to the reactant gas mixture to ignite and sustain a glow discharge of plasma (which may alternatively be phrased as "igniting a plasma") within the area identified as 23. Components of a first reactive precursor gas (or gases) (which may alternatively be referred to as the reactant gas mixture) are then dissociated in the plasma to provide charged atoms which nucleate to form MX-functional nanoparticles. However, other discharge tube 22 configurations are contemplated, and may be used in carrying out the method disclosed herein.

In the embodiment of FIG. 1, the MX-functional nanoparticles are collected in the particle collection chamber 26 in the capture fluid 27. To control diameter of the MX-functional nanoparticles, a distance between an aperture 31 in the outlet 30 of the plasma generating chamber 22 and a surface of the capture fluid 27 ranges from 5 to 50 times a diameter of the aperture 31 (i.e., from 5 to 50 aperture diameters). Positioning the surface of the capture 27 too close to the outlet of the plasma generating chamber may result in undesirable interactions of plasma with the capture fluid 27. Conversely, positioning the surface of the capture fluid 27 too far from the aperture reduces particle collection efficiency. As collection distance is a function of the aperture diameter of the outlet and a pressure drop between the plasma generating chamber and the collection chamber, an acceptable collection distance is from 1 cm to 20 cm, alternatively from 5 cm to 10 cm, alternatively from 6 cm to 12 cm based on the operating conditions described herein.

The plasma generating chamber 22 also comprises a HF or VHF RF power source (not shown). Power is supplied from the power source via the variable frequency RF power amplifier 21 that is triggered by an arbitrary function generator to establish a high frequency pulsed plasma (alternatively referred to simply as a plasma) in area 23. Typically, radiofrequency power is capacitively coupled into the plasma creating a capacitively coupled plasma discharge using a ring electrode, parallel plates, or an anode/cathode setup in the gas. Alternatively, the radiofrequency power may be inductively coupled into the plasma using an RF coil disposed around the discharge tube 22 in an inductively coupled plasma (ICP) reactor arrangement.

The plasma generating chamber 22 may also comprise a dielectric discharge tube (not shown). Typically, a reactant gas mixture enters the dielectric discharge tube where the plasma is generated.

MX-functional nanoparticles, which form from the reactant gas mixture, start to nucleate as molecular components of the first reactive precursor gas dissociate in the plasma.

In various embodiments, the plasma generating chamber 22 comprises, alternatively is, quartz.

The vacuum source 28 may comprise a vacuum pump. Alternatively, the vacuum source 28 may comprise a mechanical, turbo molecular, diffusion, or cryogenic pump.

In one embodiment, the electrode configurations 24, 25 for the plasma generating chamber 22 comprise a flow-through showerhead design in which a VHF radio frequency biased upstream porous electrode plate 24 is separated from a downstream porous electrode plate 25, with the pores of the plates aligned with one another. The pores may be circular, rectangular, or any other desirable shape. Alternatively, the plasma generating chamber 22 may include an electrode 24 that is coupled to the VHF radio frequency power source and has a pointed tip that has a variable distance between the tip and a grounded ring inside the chamber 22.

In one embodiment, the HF or VHF radio frequency power source operates at a preselected RF in a frequency range of 10 to 500 MHz to generate a plasma for a time sufficient to form the nanoparticle aerosol comprising MX-functional nanoparticles in a gas. In another embodiment, the preselected radio frequency is a continuous frequency from 10 to 500 MHz or from 30 mHz to 150 mHz and corresponds to a coupled power of from 5 to 1000 W or from 1 W to 200 W, respectively. Further alternatively, the preselected radio frequency is a continuous frequency from 100 to 150 mHz. In an alternative embodiment, the pointed tip 13 can be positioned at a variable distance from a VHF radio frequency powered ring 14 operated in a push-pull mode (180° out of phase). In yet another alternative embodiment, the electrode configuration 24, 25 includes an inductive coil coupled to the VHF radio frequency power source so that radio frequency power is delivered to the reactant gas mixture by an electric field formed by the inductive coil. Portions of the plasma generating chamber 22 can be evacuated to a vacuum level ranging between $1\times10^{-7}$ to 500 Torr or from 100 mTorr to 10 Torr. Other electrode coupling configurations are also contemplated for use with the method disclosed herein.

In the illustrated embodiment of FIG. 1, the plasma in area 23 is initiated (alternatively referred to as being ignited) via an RF power amplifier such as, for example, an AR World-wide Model KAA2040, or an Electronics and Innovation Model 3200L, or an EM Power RF Systems, Inc. Model BBS2E3KUT. The amplifier can be driven (or pulsed) by an arbitrary function generator (e.g. a Tektronix AFG3252 function generator) that is capable of producing up to 200 watts of power from 0.15 to 150 MHz. In several embodiments, the arbitrary function may be able to drive the power amplifier with pulse trains, amplitude modulation, frequency modulation, or different waveforms. Power coupling between the amplifier and the reactant gas mixture typically increases as the frequency of the RF power increases. Driving power at a higher frequency may allow more efficient coupling between the power supply and discharge. Increased coupling may be manifested as a decrease in the voltage standing wave ratio (VSWR).

$$VSWR = \frac{1+p}{1-p}, \quad (1)$$

where p is the reflection coefficient, $$p = \frac{Zp - Zc}{Zc + Zp} \quad (2)$$

with Zp and Zc representing the impedance of the plasma and coil, respectively. At frequencies below 30 MHz, only 2-15% of the power is delivered to the plasma discharge. This has the effect of producing high reflected power in and RF circuit that leads to increased heating and limited lifetime of the power supply. In contrast, higher frequencies allow more power to be delivered to the plasma discharge, thereby reducing the amount of reflected power in the RF circuit.

In one embodiment, the power and frequency of the plasma discharge is preselected to create an optimal operating space for the formation of the MX-functional nanoparticles. Typically, tuning both power and frequency creates an appropriate ion and electron energy distribution in the plasma discharge to help dissociate the molecules of the reactive precursor gas and nucleate the MX-functional nanoparticles. The power of the plasma discharge controls the temperature of individual particles within the plasma discharge. By controlling the temperature of individual particles within the plasma discharge, it is possible to control the crystallinity of nanoparticles formed within the plasma discharge. Higher power yields crystalline particles, while low power produces amorphous particles. Appropriate control of both power and frequency prevents the nanoparticles from growing too large depending on a desired size.

The plasma reactor system 20 illustrated in FIG. 1 may be pulsed to enable an operator to directly manage the residence time for particle nucleation, and thereby control the particle size distribution and agglomeration kinetics in the plasma. A pulsing function of the system 20 allows for controlled tuning of the particle residence time in the plasma, which affects the size of the MX-functional nanoparticles. By decreasing "on" time of the plasma, nucleating particles have less time to agglomerate, and therefore the size of the MX-functional nanoparticles may be reduced on average (i.e., the nanoparticle distribution may be shifted to smaller diameter particle sizes).

A distance between the nanoparticle synthesis location and the surface of the capture fluid 27 is typically sufficiently short in order to avoid unwanted agglomeration of entrained nanoparticles.

The size distribution of the nanoparticles can also be controlled by controlling the plasma residence time, a high ion energy/density region of the VHF radio frequency low pressure glow discharge relative to said at least one precursor gas molecular residence time through the discharge. Typically, the lower the plasma residence time of a VHF radio frequency low pressure glow discharge relative to the gas molecular residence time, the smaller will be mean nanoparticle diameter at constant operating conditions. Operating conditions may be defined by the discharge drive frequency, drive amplitude, discharge tube pressure, chamber pressure, plasma power density, precursor mass flow rates, and collection distance from plasma source electrodes. However, other operating conditions are also contemplated. For example, as the plasma residence time of a VHF radio frequency low pressure glow discharge relative to the gas molecular residence time increases, the mean nanoparticle diameter follows an exponential growth model of $y=y_0-\exp(-t_r/C)$, where y is the mean nanoparticle diameter, $y_0$ is the offset, $t_r$ is the plasma residence time, and C is a constant. The particle size distribution may also increase as plasma residence time increases under otherwise constant operating conditions.

In another embodiment, the mean particle diameter of the nanoparticles (as well as the nanoparticle size distribution) can be controlled by controlling a mass flow rate of at least one precursor gas in a VHF radio frequency low pressure glow discharge. For example, as the mass flow rate of precursor gas (or gases) increases in the VHF radio frequency low pressure plasma discharge, the synthesized mean nanoparticle diameter may decrease following an exponential decay model of the form $y=y_o+\exp(-MFR/C')$, where y is the mean nanoparticle diameter, $y_o$ is the offset, MFR is the precursor mass flow rate, and C' is a constant, for constant operating conditions. Typical operating conditions may include discharge drive frequency, drive amplitude, discharge tube pressure, chamber pressure, plasma power density, gas molecule residence time through the plasma, and collection distance from plasma source electrodes. The synthesized mean nanoparticle size distribution may also decrease as an exponential decay model of the form $y=y_o+\exp(-MFR/K)$, where y is the mean nanoparticle diameter, $y_o$ is the offset, MFR is the precursor mass flow rate, and K is a constant, for constant operating conditions.

Advantageously, the operation of the plasma reactor system 20 at higher frequency ranges and pulsing the plasma provides the same conditions as in conventional constricted/filament discharge techniques that use a plasma instability to produce the high ion energies/densities, but with the additional advantage that users can control operating conditions to select and produce MX-functional nanoparticles having various predetermined sizes, which impacts their characteristic physical properties, e.g. photoluminescence.

For a pulse injection, the synthesis (which may alternatively be referred to as deposition) of the MX-functional nanoparticles can be achieved using a pulsed energy source, such as a pulsed very high frequency RF plasma, a high frequency RF plasma, or a pulsed laser for pyrolysis. Typically, the VHF radiofrequency is pulsed at a frequency ranging from 1 to 50 kHz.

Another method to transfer the MX-functional nanoparticles to the capture fluid 27 is to pulse input of the reactant gas mixture while the plasma is ignited. For example, one could ignite the plasma in which a first reactive precursor gas is present to synthesize the MX-functional nanoparticles, with at least one other gas present to sustain the discharge, such as an inert gas. The synthesis of the MX-functional nanoparticles is stopped when the flow of first reactive precursor gas is stopped with a mass flow controller. The synthesis of the MX-functional nanoparticles continues when the flow of the first reactive precursor gas is started again. This produces a pulsed stream of MX-functional nanoparticles. This technique can be used to increase the concentration of MX-functional nanoparticles in the capture fluid 27 if the flux of MX-functional nanoparticles impinging on the capture fluid 27 is greater than the absorption rate of the MX-functional nanoparticles into the capture fluid 27. The MX-functional nanoparticles can also be evacuated from the plasma reactor 22 to the particle collection chamber 26 by cycling the plasma to a low ion energy state, or by turning the plasma off.

In another embodiment, the MX-functional nanoparticles are transferred from the plasma generating chamber 22 to particle collection chamber 26 containing the capture fluid 27 via the aperture or orifice 31 which creates a pressure differential. It is contemplated that the pressure differential between the plasma generating chamber 22 and the particle collection chamber 26 can be controlled through a variety of means. In one configuration, the discharge tube 22 has an inside diameter that is much less than an inside diameter of the particle collection chamber 26, thus creating the pressure drop. In other words, a pressure of the vacuum particle collection chamber 26 is less than a pressure of the reaction chamber 22. In various embodiments the pressure of the deposition chamber is $<1\times10^{-5}$ Torr (produced by a high vacuum pump, i.e. turbo-molecular, cryogenic, or diffusion pump). The pressure drop is sufficient to create a supersonic jet of particles streaming out of the plasma chamber. The supersonic jet minimizes any gas phase particle-to-particle interactions, thus keeping the nanoparticles monodispersed in a gas stream. In another configuration, a grounded physical aperture or orifice 31 may be placed between the discharge tube 22 and the collection chamber 26 that forces the plasma to reside partially inside the orifice 31, based on Debye length of the plasma and size of the chamber 22. Another configuration comprises using a varying electrostatic orifice 31 in which a positive concentric charge is developed that forces the negatively charged plasma through the aperture 31.

The nanoparticles exit the plasma disposed in the plasma generating chamber 22. In certain embodiments when the nanoparticles are silicon nanoparticles, the nanoparticles have $SiH_x$ (x<4), radicals (dangling bonds), and/or halogen species (if present in the discharge tube) on the surface thereof.

As first introduced above, in the embodiment of FIG. 1, upon the dissociation of molecules of the first reactive precursor gas in the plasma generation chamber 22, MX-functional nanoparticles form and are entrained in the gas phase. The distance between the nanoparticle synthesis location and the surface of the capture fluid 27 is typically selected so that no unwanted nucleation or functionalization occurs while the MX-functional nanoparticles are entrained in the gas phase. If the MX-functional nanoparticles interact within the gas phase, agglomerations of numerous individual small MX-functional nanoparticles will form and be captured in the capture fluid 27. If too much interaction takes place within the gas phase, the MX-functional nanoparticles may sinter together and form MX-functional nanoparticles having larger average diameters. The collection distance is defined as the distance from the outlet of the plasma generating chamber 22 to the surface of the capture fluid 27. The capture fluid 27 is described in detail below following the description of an alternative embodiment of a plasma reactor system 20.

Additional aspects relating to this particular embodiment in which the MX-functional nanoparticles are produced via this plasma process are described in International (PCT) Publication No. WO 2011/109299 (PCT/US2011/026491), which is incorporated by reference herein in its entirety.

Figure 2:
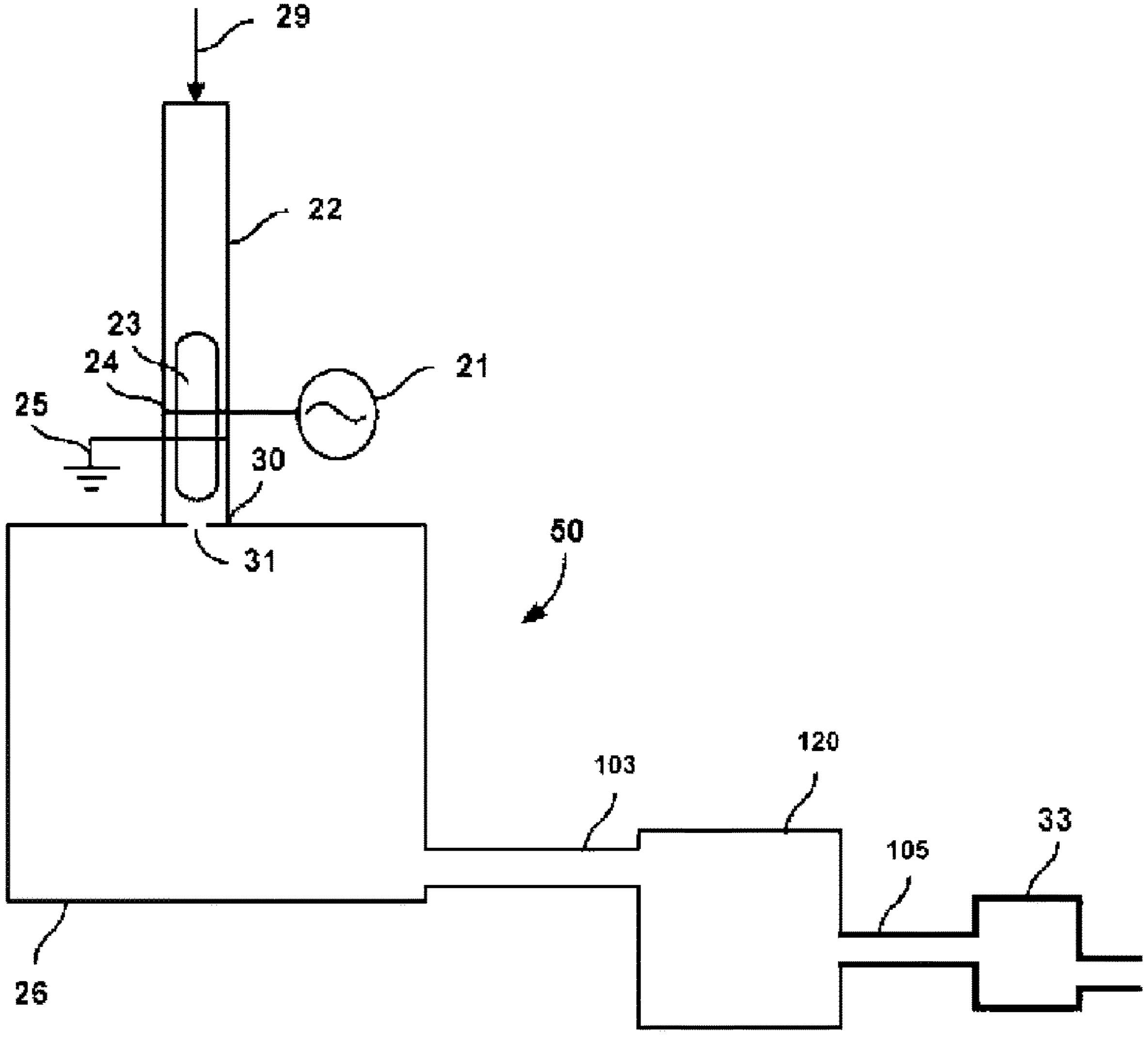
FIG. 2 illustrates an embodiment of a system including a low pressure pulsed plasma reactor to produce nanoparticles and a diffusion pump to collect the nanoparticles.

Referring to FIG. 2, an alternative embodiment of a plasma reactor system is shown at 50. In this embodiment, the MX-functional nanoparticles are prepared in a plasma reactor system 50 having a reactor 22 and a diffusion pump 120 in fluid communication with the reactor 22 where the diffusion pump 120 is for collecting the MX-functional nanoparticles. MX-functional nanoparticles of various size distributions and properties can be prepared by introducing a nanoparticle aerosol comprising MX-functional nanoparticles entrained in a gas where the nanoparticles are produced in the reactor 22 (e.g., a low-pressure plasma reactor) into the diffusion pump 120 in fluid communication with the reactor 22, capturing the MX-functional nanoparticles of the aerosol in a condensate comprising the capture fluid (not shown), and collecting in a reservoir 107 the condensate containing the nanoparticles. In the embodiment of FIG. 2, the capture fluid may alternatively be referred to as a diffusion pump fluid, although the capture fluid and diffusion pump fluid are generally referred to herein as "the capture fluid" and are described collectively herein.

Example reactors suitable for the present embodiment are described in WO 2010/027959 and WO 2011/109229, each of which is being incorporated by reference herein in its respective entirety. Such reactors can be, but are not limited to, low pressure high frequency pulsed plasma reactors. For example, FIG. 2 illustrates the plasma reactor 22 of the embodiment of FIG. 1, but includes the diffusion pump 120 in fluid communication with the reactor 22. To this end, a description relative to this particular plasma reactor 22, which has already been fully described supra, is not repeated herein with respect to the embodiment of FIG. 2.

In the embodiment of FIG. 2, the plasma reactor system 50 includes a diffusion pump 120. As such, the MX-functional nanoparticles can be collected by the diffusion pump 120. A particle collection chamber 26 may be in fluid communication with the plasma generating chamber 22. The diffusion pump 120 may be in fluid communication with the particle collection chamber 26 and the plasma generating chamber 22. In other forms of the present disclosure, the plasma reactor system 50 may exclude the particle collection chamber 26. For example, the outlet 30 may be coupled to an inlet 103 of the diffusion pump 120, or the diffusion pump 120 may be in substantially direct fluid communication with the plasma generating chamber 22.

Figure 3:
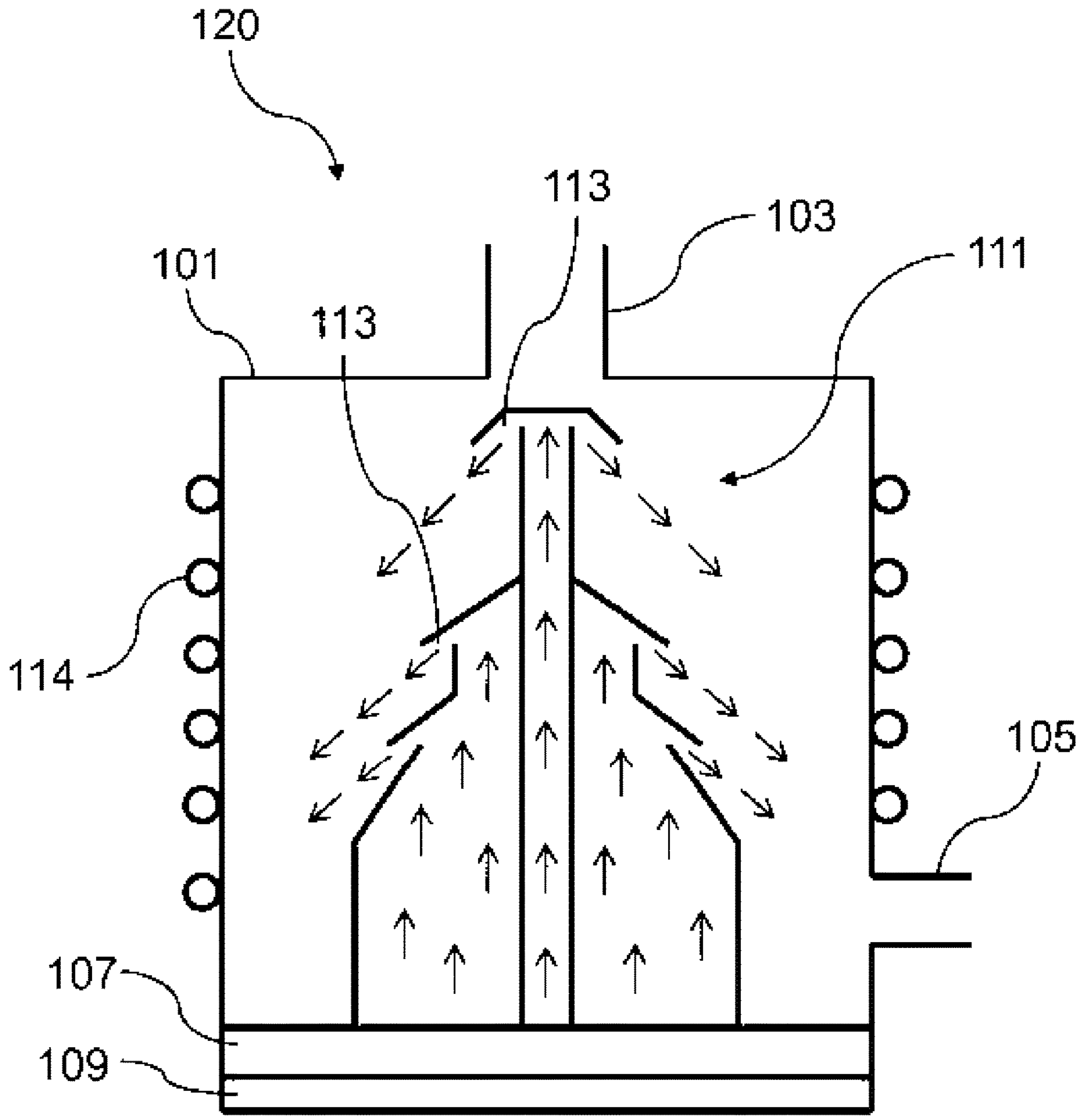
FIG. 3 illustrates a schematic view of one embodiment of a diffusion pump for collecting nanoparticles produced via a reactor.

FIG. 3 is a cross-sectional schematic of an example diffusion pump 120 suitable for the plasma reactor system 50 of the embodiment of FIG. 2. The diffusion pump 120 can include a chamber 101 having an inlet 103 and an outlet 105. The inlet 103 may have a diameter of 5 cm to 140 cm, and the outlet may have a diameter of 1 cm to 21 cm. The inlet 103 of the chamber 101 is in fluid communication with the outlet 30 of the reactor 20. The diffusion pump 120 may have, for example, a pumping speed of 65 to 65,000 liters/second or greater than 65,000 liters/second.

The diffusion pump 120 includes a reservoir 107 in fluid communication with the chamber 101. The reservoir 107 supports or contains the capture fluid. The reservoir may have a volume of 30 ml to 15 liters. The volume of the capture fluid in the diffusion pump may be 30 ml to 15 liters. The diffusion pump 120 can further include a heater 109 for vaporizing the capture fluid in the reservoir 107. The heater 109 heats up the capture fluid and vaporizes the capture fluid to form a vapor (e.g., liquid to gas phase transformation). For example, the capture fluid may be heated to 100 to 400° C. or 180 to 250° C.

A jet assembly 111 can be in fluid communication with the reservoir 107 and the jet assembly 111 can comprise nozzles 113 for discharging the vaporized capture fluid into the chamber 101. The vaporized capture fluid flows and rises up though the jet assembly 111 and is emitted out the nozzles 113. The flow of the vaporized capture fluid is illustrated in FIG. 3 using arrows. The vaporized capture fluid condenses and flows back to the reservoir 107. For example, the nozzle 113 can discharge the vaporized capture fluid against a wall of the chamber 101. Walls of the chamber 101 may be cooled with a cooling system 114 such as a water cooled system. Cooled walls of the chamber 101 can cause the vaporized capture fluid to condense. The condensed capture fluid can then flow along and down the walls of the chamber 101 and back to the reservoir 107 under the force of gravity. The capture fluid can be continuously cycled through diffusion pump 120. The flow of the capture fluid causes gas that enters the inlet 103 to diffuse from the inlet 103 to the outlet 105 of the chamber 101. A vacuum source 33 may be in fluid communication with the outlet 105 of the chamber 101 to assist removal of the gas from the outlet 105.

As gas flows through the chamber 101, MX-functional nanoparticles entrained in the gas can be absorbed by the capture fluid, which thereby collects the MX-functional nanoparticles from the gas. For example, a surface of the MX-functional nanoparticles may be wetted by the vaporized and/or condensed capture fluid. Agitating of cycled capture fluid may further improve absorption rate of the MX-functional nanoparticles compared to a static fluid. The pressure within the chamber 101 may be less than 1 mTorr.

The capture fluid with the MX-functional nanoparticles can be removed from the diffusion pump 120. For example, the capture fluid with the MX-functional nanoparticles may be continuously removed and replaced with capture fluid that substantially does not include MX-functional nanoparticles.

Advantageously, the diffusion pump 120 can be used not only for collecting MX-functional nanoparticles but also for evacuating the reactor 22 and collection chamber 26. For example, the operating pressure in the reactor 22 can be a low pressure, e.g. less than atmospheric pressure, less than 760 Torr, or between 1 and 760 Torr. The collection chamber 26 can, for example, range from 1 to 5 milliTorr or have a pressure of less than $1\times10^{-5}$ Torr. Other operating pressures are also contemplated.

The system 50 may also include the vacuum pump or vacuum source 33 in fluid communication with the outlet 105 of the diffusion pump 120. The vacuum source 33 can be selected in order for the diffusion pump 120 to operate properly. In one form of the present embodiment, the vacuum source 33 comprises the vacuum pump (e.g., auxiliary pump). The vacuum source 33 may comprise a mechanical, turbo molecular, or cryogenic pump. However, other vacuum sources are also contemplated.

One method of producing MX-functional nanoparticles with the system 50 of FIG. 2 can include forming a nanoparticle aerosol in the reactor 22. The nanoparticle aerosol can comprise MX-functional nanoparticles in a gas, and the method further includes introducing the nanoparticle aerosol into the diffusion pump 120 from the reactor 5. In this embodiment, the method also may include heating the capture fluid in a reservoir 107 to form a vapor, sending the vapor through the jet assembly 111, emitting the vapor through nozzles 113 and into a chamber 101 of the diffusion pump 120, condensing the vapor to form a condensate, and flowing the condensate back to the reservoir 107. The method can further include capturing in the condensate, which comprises the capture fluid, the MX-functional nanoparticles of the MX-functional nanoparticle aerosol and collecting the captured MX-functional nanoparticles in the reservoir 107. The action of capturing the MX-functional nanoparticles of the aerosol in the condensate, which comprises the capture fluid, may be identical to the action of collecting the MX-functional nanoparticles of the aerosol in the capture fluid. The method can further include removing the gas from the diffusion pump 120 with a vacuum pump 33. In the embodiment described supra and illustrated in FIG. 1, the MX-functional nanoparticles are collected directly in capture fluid. However, in the embodiment described immediately supra and illustrated in FIGS. 2 and 3, capture fluid is vaporized and condensed in the diffusion pump 120, and the MX-functional nanoparticles are ultimately captured or collected in the capture fluid when the vaporized capture fluid condenses.

Independent of the particular plasma reactor utilized to prepare the nanoparticle aerosol, the MX-functional nanoparticles are collected in the capture fluid or diffusion pump fluid, which may also serve as the capture fluid.

As introduced above, the capture fluid comprises a polar aprotic fluid. The polar aprotic fluid (which may alternatively be referred to herein as an aprotic fluid) of various embodiments has a viscosity at 25° C. of from 5 cP to 200 centiPoise (cP). Viscosity may be measured at 25° C. via a Brookfield LV DV-E viscometer, as understood in the art. The polar aprotic fluid may serve as a solvent or vehicle for the nanoparticles, as described in greater detail below. IUPAC defines "dipolar aprotic solvent" (alternatively referred to as polar aprotic fluids or polar aprotic fluids herein) as a solvent with a comparatively high relative permittivity (or dielectric constant), greater than around 15, and a sizable permanent dipole moment, that cannot donate suitable labile hydrogen atoms to form strong hydrogen bonds. Polar aprotic solvents are typically not strictly "aprotic" but, rather, protophilic (and, at most, weakly protogenic).

Non-limiting examples of polar aprotic fluids suitable for use as the polar aprotic fluid include alkyl carbonates (e.g. ethylene carbonate, propylene carbonate, dimethyl carbonate, and diethyl carbonate), esters (e.g. ethyl formate, methyl formate, methyl acetate, and ethyl acetate), cyclic ethers (e.g., 1,3-dioxolane, tetrahydrofuran, 2-methyltetrahydrofuran, and 2,5-dimethyltetrahydrofuran), lactones (e.g. valerolactone, and γ-butyrolactone), aliphatic ethers (e.g., diethylether, and 1,2-dimethoxyether), hexamethylphosphorous triamide (HMPT), hexamethylphosphoramide (HMPA), dichloromethane, N-methylpyrrolidone, alkylated alkylene glycols (e.g., mono- and di-alkyl polyalkylene glycols, including tetraethylene glycol dialkyl ethers such as tetra(ethylene glycol) dihexyl ether (DHTEG)), N-methylpyrrolidone, acetone, dimethylformamide (DMF), acetonitrile, dimethyl sulfoxide (DMSO), propylene carbonate (PC), dichloromethane, tetrahydrofuran (THF), acetonitrile, and various mixtures thereof.

In specific embodiments, the polar aprotic fluid comprises, alternatively is, a polyalkylene glycol dialkyl ether having the formula $R^2$—$[OCH_2CH_2]_nOR^3$, where each of $R^2$ and $R^3$ is an independently selected hydrocarbyl group and subscript n is >2. In some such embodiments, subscript n is 4 such that the polyalkylene glycol dialkyl ether is a tetraethylene glycol dialkyl ether. In these or other embodiments, each of $R^2$ and $R^3$ is an independently selected $C_5$-$C_8$ hydrocarbyl group. Examples of suitable $C_5$-$C_8$ hydrocarbyl groups include pentyl, hexyl, heptyl, and octyl groups. In some such embodiments, at least one of $R^2$ and $R^3$ is hexyl. In particular embodiments, both $R^2$ and $R^3$ are hexyl, such that the polar aprotic fluid comprises tetraethylene glycol dihexyl ether.

The capture fluid comprises the polar aprotic fluid, as described above. The capture fluid further comprises a compound (alternatively referred to as a functionalization compound or as a pendant precursor) including a functional group Y reactive with the functional group X of the MX-functional nanoparticles. The capture fluid generally comprises the functionalization compound at the time the MX-functional nanoparticles are collected in the capture fluid. In other embodiments, the functionalization compound is added to the capture fluid after collecting the MX-functional nanoparticles.

One advantage of using a polar aprotic fluid is that the polar aprotic fluid allows for dissolution of the functionalization compound (including polar/hydrophilic pendant precursors) while being immiscible with liquid water, which allows for passivation of nanoparticles with greater control than is possible using amphiphilic fluids, such as methyl terminated polyethylene glycols (PEGs). Therefore, in various embodiments, the polar aprotic fluid is immiscible with water and miscible with the functionalization compound. Further, in various embodiments, the polar aprotic fluid has an exceptionally low volatility.

The selection of the functionalization compound and the functional group Y of the compound is based on the functional group X of the MX-functional nanoparticles. For example, certain functional groups are reactive with hydrogen but not halogen atoms, whereas other functional groups are reactive with halogen atoms but not hydrogen. The functionalization compound is typically organic, i.e., the functionalization compound generally comprises carbon atoms.

In certain embodiments, the functional group X of the MX-functional nanoparticles is H, in which case the MX-functional nanoparticles may be referred to as MH-functional nanoparticles. In these embodiments, the functional group Y of the functionalization compound comprises an aliphatic carbon-carbon multiple bond, such that the functionalization compound may be defined as an unsaturated organic compound. Such embodiments, i.e., those involving MH-functional nanoparticles and where the functional group Y of the functionalization compound comprises an aliphatic carbon-carbon multiple bond (i.e., is the unsaturated organic compound), are described below.

The aliphatic carbon-carbon multiple bond may be a double bond (C═C) or a triple bond (C≡C). Further, the unsaturated organic compound may have more than one carbon-carbon multiple bond, with each carbon-carbon multiple bond being independently selected from a double bond and a triple bond. The aliphatic carbon-carbon multiple bond may be within a backbone of the unsaturated organic compound, pendent from the unsaturated organic compound, or at a terminal location of the unsaturated organic compound. For example, the unsaturated organic compound may be linear, branched, or partly branched, and the aliphatic carbon-carbon multiple bond may be located at any location of the unsaturated organic compound. Typically, the unsaturated organic compound is aliphatic, although the unsaturated organic compound may have a cyclic and/or aromatic portion, so long as the carbon-carbon multiple bond is located in an aliphatic portion of the unsaturated organic compound, i.e., the carbon-carbon multiple bond of the unsaturated organic compound is not present in, for example, an aryl group. In certain embodiments, the aliphatic carbon-carbon multiple bond is present at a terminal location of the unsaturated organic compound, i.e., the alpha carbon of the unsaturated organic compound is part of the carbon-carbon multiple bond. This embodiment generally reduces steric hindrance of the aliphatic carbon-carbon multiple bond for reasons described below.

The unsaturated organic compound is not particularly limited, and may be selected based on the description and use of the functionalization compound herein. In certain embodiments, the unsaturated organic compound is a hydrocarbon compound, i.e., comprises, carbon and hydrogen atoms, and may be substituted or unsubstituted. By "substituted," it is meant that one or more hydrogen atoms of the unsaturated organic compound may be replaced with atoms other than hydrogen (e.g. a heteroatom, such as oxygen, nitrogen, or a halogen atom such as chlorine, fluorine, bromine, etc.), and one or more carbon atoms within the chain of the unsaturated organic compound may be replaced with an atom other than carbon, i.e., the unsaturated organic compound may include one or more heteroatoms within the chain, such as oxygen, sulfur, nitrogen, etc.

Generally, the unsaturated organic compound includes at least 5, alternatively at least 10, alternatively at least 15, alternatively at least 20, alternatively at least 25, carbon atoms in its chain. However, as described above, at least one carbon atom of the chain of the unsaturated organic compound may be substituted by an atom other than carbon, e.g. O. To this end, the values set forth above relative to the carbon atoms of the chain of the unsaturated compound also include any heteroatoms of the chain of the unsaturated compound. For example, in various embodiments, the unsaturated organic compound may comprise an ester, e.g. in a hydrocarbon chain of the unsaturated organic compound. In such embodiments, the unsaturated organic compound is typically a$\geq C_{10}$ ester. Specific examples of such esters include allyl dodecanoates, dodecyl 3-butenoates, propyl 10-undecenoates, 10-undecenyl acetates, dodecyl (meth)acrylates, and the like.

In some embodiments, the functional group X of the MX-functional nanoparticles is an independently selected halogen atom. In these embodiments, the functional group X is independently selected from fluorine (F), chlorine (Cl), bromine (Br), and iodine (I). Typically, X is Cl when X is a halogen atom. In these embodiments, the functional group Y of the functionalization compound of the capture fluid is reactive with the functional group X of the MX-functional nanoparticles, i.e., the functional group Y is reactive with a halogen atom.

In embodiments where the functional group X of the MX-functional nanoparticles is the independently selected halogen atom, specific examples of the functionalization compound include, but are not limited to, an alcohol compound such as methanol, ethanol, 1-propanol, 2-propanol, n-butanol, sec-butanol, iso-butanol, tert-butanol, n-hexanol, n-octanol, n-decanol; a thiol compound such as methanethiol, ethanethiol, 1-propanethiol, 2-propanethiol, n-butanethiol, sec-butanethiol, iso-butanethiol, tert-butanethiol, n-hexanethiol, n-octanethiol, n-decanethiol; an amine compound such as methylamine, dimethylamine, ethylamine, diethylamine, phenylamine, diphenylamine; a carboxylic acid compound such as acetic acid, propanoic acid, butanoic acid, hexanoic acid, octanoic acid, decanoic acid, benzanoic acid; a sulphide compound such as hydrogen sulfide; an amide compound such as acetamide, propanamide, butanamide, hexanamide, octanamide, decanamide, benzamide; a phosphine compound such as methylphosphine, dimethylphosphine, ethylphosphine, diethylphosphine, phenylphosphine, diphenylphosphine; a metal halide compound such as lithium fluoride, lithium chloride, lithium bromide, sodium fluoride, sodium chloride, sodium bromide, potassium fluoride, potassium chloride, potassium bromide; a terminal alkyne compound such as acetylene, propyne, but-1-yne, hex-1-yne, oct-1-yne, phenylacetylene; an organometallic compound, an alkali metal amide compound such as lithium amide, lithium methylamide, lithium dimethylamide, diisopropylamide; a metal thiolate compound such as lithium methanethiolate, sodium methanethiolate, potassium methanethiolate, lithium ethanethiolate, sodium ethanethiolate, potassium ethanethiolate, lithium phenylthiolate sodium phenylthiolate, potassium phenylthiolate; and combinations thereof. Specific examples of organometallic compounds include, but are not limited to, metal alkoxide compounds such as lithium methoxide, sodium methoxide, potassium methoxide, lithium ethoxide, sodium ethoxide, potassium ethoxide, lithium phenoxide, sodium phenoxide, potassium phenoxide; Grignard reagents such as methyl magnesium chloride, methyl magnesium bromide, ethyl magnesium chloride, ethyl magnesium bromide, phenyl magnesium chloride, phenyl magnesium bromide; organozinc reagents such as dimethyl zinc, diethyl zinc, diphenyl zinc, methylzinc chloride, methylzinc bromide, ethylzinc chloride, ethylzinc bromide, phenylzinc chloride, phenylzinc bromide; Gilman reagents such as lithium dimethylcuprate lithium diethylcuprate, lithium diphenylcuprate; organosodium reagents such as methylsodium, ethylsodium, phenylsodium; organopotassium reagents such as methylpotassium, ethylpotassium, phenylpotassium; organocalcium reagents such as methylcalcium iodide, diphenylcalcium, dibenzylcalcium; organolithium reagents such as methyllithium, ethyllithium, phenyllithium; and combinations thereof.

In various embodiments, the functional group Y of the functionalization compound is a nucleophilic functional group reactive with the halogen atom X of the MX-functional nanoparticles. In such embodiments, the functionalization compound may be an alcohol compound, a thiol compound, a cyanate compound, an amine compound, an azide compound, a nitrile compound, a carboxylic acid compound, a sulfide compound, an amide compound, a phosphine compound, a metal halide compound, a terminal alkyne compound, an organometallic compound, an alkali metal amide compound, a metal thiolate compound, or combinations thereof. It will be appreciated that reference to the functionalization compound being an "alcohol compound", a "thiol compound," etc. refers to the functionalization compound comprising a particular functional group (e.g. an alcohol and/or thiol functional group, for example), which typically composes the functional group Y.

Each of the specific examples of the functionalization compound listed immediately supra includes a functional group Y that is reactive with a halogen atom. As in embodiments where the functionalization compound comprises the unsaturated organic compound, the functional group Y may be located at any location within the compound, but is typically terminal, e.g. bonded to an alpha carbon of the compound. Some of the specific examples of the functionalization compound set forth above may be complexes, e.g. including ligands. There are no specific limitations with respect to the functionalization compound so long as the functionalization compound is reactive with the functional group X of the MX-functional nanoparticles.

It is to be appreciated that the descriptions herein with respect to particular portions of the functionalization compound, including the functional group Y and other portions thereof, may be used alternatively or in combination, such that the functionalization compound may comprise multiple independently selected functional groups.

The capture fluid generally comprises the functionalization compound in an amount sufficient to provide a molar ratio of the functional group Y to MX bonds in the MX-functional nanoparticles of at least 1:1, alternatively at least 1.2:1, alternatively at least 1.4:1. Molar ratios much higher than 1.4:1 may advantageously be utilized.

If desired, the functionalization compound may include additional functionality (i.e., functionality other than and in addition to the functional group Y). For example, in certain embodiments, the functionalization compound further comprises at least one functional group Z in addition to the functional group Y, with the functional group Z being convertible to a hydrophilic functional group. In various embodiments, the functionalization compound may be a hydrophilic or polar (i.e., the functionalization compound includes hydrophilic or polar moieties) and not include any functional group Z convertible to a hydrophilic functional group. When a functionalization compound includes a Z group or the functionalization compound is hydrophilic or polar, the functionalization compound may be referred to as a polar pendant precursor or as a hydrophilic pendant precursor where the word "precursor" may be understood to alternatively (depending upon the nature of a particular functionalization compound) modify either the word "pendant" alone or the phrases "polar pendant" and "hydrophilic pendant," respectively.

When referring to the functional group Z as being convertible, it is to be understood that the word "convertible" is used to indicate that the functional group Z may undergo a chemical reaction to yield a hydrophilic functional group having a comparatively greater hydrophilicity than the functional group Z species prior to being subjected to the chemical reaction. The functional group Z may, in certain embodiments, be selected from some of the functional groups set forth above suitable for the functional group Y, although in such embodiments, the functional group Z is separate from and in addition to the functional group Y in the compound. In various embodiments, the functional group Z may be converted to a hydrophilic or polar functional group by being put in contact with and reacted with a deprotection compound, such as tetrafluoro acetate (TFA).

A specific example of a conversion is a deprotection reaction, which is readily understood in the art as removing a protecting group from an otherwise reactive functional group. For example, in particular embodiments, the functionalization compound comprises a protected functional group, such as a trialkylsilyl ether group, a ketal group, etc., which may be readily converted to an unprotected functional group, such as, in this example, an alcohol or diol, respectively. Such protected functional groups may be utilized to prevent undesired reaction during the method, to influence the solubility and/or reactivity of the functionalization compound, to influence the purification of any of the reaction products of the method, or combinations thereof.

Specific examples of hydrophilic functional groups include carboxylic acid functional groups, alcohol functional groups, hydroxy functional groups, azide functional groups, silyl ether functional groups, ether functional groups, phosphonate functional groups, sulfonate functional groups, thiol functional groups, amine functional groups, anhydride functional groups, and combinations thereof. The amine functional group may be primary, secondary, tertiary, or cyclic. Such hydrophilic functional groups may be bonded directly to a chain of the functionalization compound, e.g. to a carbon atom of the chain, or may be bonded via a heteroatom or bivalent linking group. In various embodiments, the functionalization compound comprises a hydrophilic functional group different from Y in addition to functional group Z or in the absence of any functional group Z.

In certain embodiments, the functionalization compound may include the hydrophilic functional group, such as any of the hydrophilic functional groups set forth above. Alternatively, the functionalization compound may include the at least one functional group Z convertible to a hydrophilic functional group such that the functionalization compound does not include a hydrophilic functional group until the at least one functional group Z is converted thereto.

Specific examples of the at least one functional group Z convertible to a hydrophilic functional group include, but are not limited to: ester functional groups, including those of oxo acids, such as esters of carboxylic acid, sulfuric acid, phosphoric acid, nitric acid, and boric acid; acid halide functional groups; amide functional groups; nitrile functional groups; disulfide functional groups; epoxide functional groups; silyl ether functional groups; ethylenically unsaturated groups in addition to the aliphatic carbon-carbon multiple bond; oxazoline functional groups; and anhydride functional groups. Esters of oxo acids may be derived from condensation of any alcohol with a particular oxo acid where the alcohol may be aliphatic or aromatic. The at least one functional group Z may be a substituent of the functionalization compound or a moiety within the functionalization compound. For example, when the functionalization compound includes an ester functional group, the ester functional group is generally a moiety within the functionalization compound, as opposed to a substituent bonded thereto.

The at least one functional group Z of the functionalization compound is generally selected based on the functional group X of the MX-functional nanoparticles as well as the functional group Y of the compound. For example, when X is H, reacting X and Y results in Si—C bonds. In contrast, when X is an independently selected halogen atom, reacting X with Y may result in SiC bonds, Si—O—C bonds, and/or Si—N—C bonds. Because Si—O—C bonds, and/or Si—N—C bonds may hydrolyze, further reaction to form the hydrophilic functional group is generally not carried out in an aqueous medium. In these embodiments, the compound may further comprise a butoxycarbonyl group.

In particular embodiments, the functionalization compound comprises, alternatively is, a diglycerol ether compound. In some such embodiments, the diglycerol ether compound has the following formula:

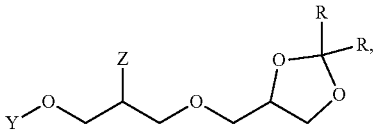

where the functional group Y comprises an unsaturated group, functional group Z comprises a protected alcohol group (i.e., a protected hydrophilic group), and each R is an independently selected hydrocarbyl group or H. One of skill in the art will appreciate that the acetal/ketal group in the formula above may also exemplify the functional group Z, as such an acetal/ketal may be converted to a 1, 2, diol functional group via acidic deprotection. In some such embodiments, Y is an allyl group, Z is a trimethylsilyl (TMS)-protected alcohol, and each R is methyl, such that the diglycerol ether compound has the following structure:

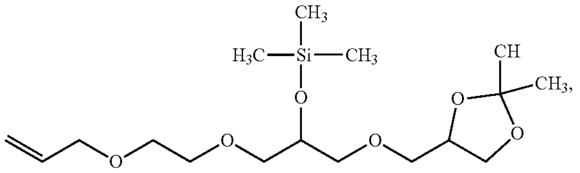 [SMILES: C=CCOCCOCC(COCC1COC(C)(C)O1)O[Si](C)(C)C]

which may be referred to herein as O-TMS allyl ethylene glycol diglycerol ether dimethyl ketal.

The capture fluid may comprise any compounds, components, or fluids that may be suitable for capturing the nanoparticles. For example, conventional components utilized in conventional capture fluids may be utilized as the capture. Specific examples of capture fluids include silicone fluids, such as polydimethylsiloxane, phenylmethyl-dimethyl cyclosiloxane, tetramethyltetraphenyltrisiloxane, and/or pentaphenyltrimethyltrisiloxane; hydrocarbon oils (e.g., Diffoil Ultra 20 or Permavis 10); phenyl ethers; fluorinated polyphenyl ethers; ionic fluids; sulfoxides (e.g., anhydrous methyl sulfoxide); fluorocarbon fluids; and various combinations thereof. The capture fluid may have a dynamic viscosity of 0.001 to 1 Pa·s, 0.005 to 0.5 Pa·s, or 0.01 to 0.1 Pa·s at 23±3° C. Furthermore, the fluid may have a vapor pressure of less than $1\times10^{-4}$ Torr. In some embodiments, the capture fluid is at a temperature ranging from −20° C. to 150° C. and a pressure ranging from 1 to 5 milliTorr (0.133 Pa to 0.665 Pa). A low viscosity of the capture fluid is necessary to allow the MX-functional nanoparticles to be injected into or absorbed by the capture fluid without forming a film on the capture fluid's surface. In some embodiments, the capture fluid has a vapor pressure less than the pressure in the particle collection chamber 26.

It is contemplated that the capture fluid may be used as a material handling and storage medium. In an embodiment, the capture fluid is selected to allow nanoparticles to be absorbed and dispersed into the capture fluid as the nanoparticles are collected, thus forming a dispersion or suspension of nanoparticles in the capture fluid.

In various embodiments, the capture fluid comprises the functionalization compound in an amount of from greater than 0 to 100, alternatively from greater than 0 to 50, alternatively from 1 to 40, alternatively from 2 to 30, alternatively from 5 to 15, percent by weight based on total weight of the capture fluid. In various embodiments a concentration of the functionalization compound is from 0.01 wt % to 10 wt % measured with respect to the capture fluid. The balance of the capture fluid may comprise any of the components or capture fluids set forth above, but also includes the polar aprotic fluid.

In certain embodiments, the method further comprises reacting the MX-functional nanoparticles with the functionalization compound of the capture fluid to form functionalized nanoparticles, optionally in a composition.

The MX-functional nanoparticles and the functional compound may react with one another via known methods. When X is H, the reaction is generally referred to as an addition reaction. In the addition reaction carried out when the MH-functional nanoparticles comprise SiH-functional nanoparticles, the carbon-carbon multiple bond of the unsaturated organic compound described supra undergoes an addition reaction with the SiH-functional nanoparticles. For SiH-functional nanoparticles, the addition reaction is referred to as hydrosilylation; for GeH-functional nanoparticles, this addition reaction is referred to as hydrogermylation; for SnH-functional nanoparticles, this addition reaction is referred to as hydrostannylation. Alternatively, when X is an independently selected halogen atom, the reaction between the MX-functional nanoparticles and the functionalization compound is generally classified based the functionalization compound used.

In certain embodiments, particularly when X is H and the functionalization compound comprises the unsaturated organic compound, reacting the MX-functional nanoparticles with the unsaturated organic compound comprises irradiating a suspension of the MH-functional nanoparticles in the capture fluid with UV radiation. For example, reacting the MH-functional nanoparticles with the unsaturated organic compound may be photoinitiated. When reacting the MH-functional nanoparticles and the unsaturated organic compound comprises irradiating the suspension of the MH-functional nanoparticles in the capture fluid with radiation, the radiation is typically electromagnetic radiation having a wavelength of from 10 to 400, alternatively 280 to 320, nm.

Alternatively or in addition to radiation, reacting the MX-functional nanoparticles with the functionalization compound may comprise heating a suspension of the MX-functional nanoparticles and the capture fluid to or at a first temperature for a first period of time. When heat is utilized to react the MX-functional nanoparticles with the compound, the first temperature is typically from 50 to 250° C. and the first period of time is from 5 to 500 minutes.

Alternatively still, the MX-functional nanoparticles may react with the functionalization compound once the MX-functional nanoparticles are collected in the capture fluid such that no reaction condition (e.g. irradiation or heat) is utilized or applied. However, heat or irradiation generally improves a reaction between the MX-functional nanoparticles and the functionalization compound. Functionalization of the MX-functional nanoparticles may improve physical properties of a resulting nanoparticle composition, including photoluminescence and photoluminescent intensity.

If desired, a catalyst or photocatalyst may be utilized during an action of reacting the MX-functional nanoparticles with the functionalization compound. Such catalysts are well known in the art based on a desired reaction mechanism, e.g. when X is H, any catalysts suitable for hydrosilylation may be utilized, which are typically based on precious metals, e.g. platinum. However, catalysts or photocatalysts are not required for the action of reacting the MX-functional nanoparticles with the functionalization compound.

When the functionalization compound includes the at least one functional group Z convertible to a hydrophilic functional group, the method may further comprise the step of converting the functional group Z to a hydrophilic functional group. The functional group Z of the compound may be converted to a hydrophilic functional group before, during, and/or after reacting the MX-functional nanoparticles with the functionalization compound. Typically, the functional group Z of the functionalization compound is converted to a hydrophilic functional group after reacting the MX-functional nanoparticles and the functionalization compound.

The functional group Z of the functionalization compound may be converted to a hydrophilic functional group via known methods. In various embodiments, converting the functional group Z of the functionalization compound to a hydrophilic functional group comprises hydrolyzing the functional group Z.

In various embodiments, the functional group Z of the functionalization compound may be converted to a hydrophilic functional group by acidic or basic treatment. In these embodiments, an acid or base utilized is generally selected such that the acid or base is miscible with the capture fluid. Further, the acid is typically selected such that it can be removed from the capture fluid, e.g. by vacuum or washing with solvent. To this end, the acid may be selected from trifluoroacetic acid, hydrofluoric acid, and combinations thereof. The acid may be utilized in various concentrations in an aqueous form.

In one specific embodiment, the MX-functional nanoparticles are collected in the capture fluid, and the MX-functional nanoparticles and the functionalization compound are reacted in the capture fluid. After reacting the MX-functional nanoparticles and the functionalization compound, nanoparticles result which have a substituent formed from the functionalization compound. If the functionalization compound further includes the functional group Z convertible to a hydrophilic functional group, the functional group Z is present in the substituent of the nanoparticles. To this end, if the functionalization compound further includes the functional group Z convertible to a hydrophilic functional group, the method may further comprise converting the functional group Z to a hydrophilic group. An aqueous acid may be disposed in the capture fluid to convert the functional group Z to a hydrophilic functional group, optionally at a reflux temperature of the capture fluid including the aqueous acid. After converting the functional group Z to a hydrophilic functional group, the substituent of the nanoparticles includes a hydrophilic functional group.

In various embodiments, the method further comprises separating the nanoparticles and the capture fluid to form separated nanoparticles. For example, the nanoparticles and the capture fluid may be separated by centrifuging and/or decanting to yield separated nanoparticles. The separated nanoparticles may be further washed by suspension in a solvent, e.g. toluene or hexane, followed by repeated separation from the solvent by centrifuging and/or decanting. The separated nanoparticles may ultimately be dried, e.g. in vacuo, to form a dried solid. In various embodiments, the separated nanoparticles are a solid. In this embodiment, the separated nanoparticles are free-standing and not in solution or suspension. The separated nanoparticles may be utilized in various end uses and applications.

Further, when the compound includes the functional group Z convertible to a hydrophilic functional group, and when the method further comprises converting the functional group to a hydrophilic functional group, the separated nanoparticles may advantageously be suspended in a polar solvent, which offers significant advantages. For example, the method may further comprise suspending the separated nanoparticles in a polar solvent, such as an aqueous solution, optionally along with ions, e.g. from disassociated sodium bicarbonate. The polar solvent may be selected from water and a dipolar aprotic organic solvent.

After reacting the MX-functional nanoparticles with the functionalization compound, nanoparticles result which have a substituent, which is typically organic and is formed from the functionalization compound. For example, the functionalization compound is generally covalently bonded to the nanoparticles, e.g. as a ligand or substituent. The nanoparticles are generally no longer MX-functional, and thus the nanoparticles have increased stability in solution or suspension. A suspension comprising the nanoparticles in the capture fluid is generally referred to as a nanoparticle composition. The disclosure also provides the nanoparticle composition formed in accordance with the method.

MX-functional nanoparticles and nanoparticle compositions can be prepared by any of the methods described above. Any of various compositions may comprise the nanoparticles or MX-functional nanoparticles; for example, a cosmetic composition, or a composition comprising nanoparticles or MX-functional nanoparticles dispersed in a carrier fluid. Contingent on the precursor gas and molecules utilized in the plasma process, nanoparticles of various composition may be produced. The description below refers to the nanoparticles generally, which is applicable to both the MX-functional nanoparticles, as well as the nanoparticles of the nanoparticle composition formed by reacting the MX-functional nanoparticles and the functionalization compound.

The nanoparticles may exhibit a number of unique electronic, magnetic, catalytic, physical, optoelectronic and optical properties due to quantum confinement effects. For example, many semiconductor nanoparticles exhibit photoluminescence effects that are significantly greater than the photoluminescence effects of macroscopic materials of similar composition.

A diameter of the nanoparticles can be calculated from the following equation:

$$D_p = \frac{2.57811}{(h \cdot c / \lambda - E_g)^{1/1.33}}$$

As set forth in Proot, et. al. Appl. Phys. Lett., 61, 1948 (1992); Delerue, et. al. Phys. Rev. B., 48, 11024 (1993); and Ledoux, et al. Phys. Rev. B., 62, 15942 (2000), where h is Plank's constant, c is the speed of light, and $E_g$ is the bulk band gap of silicon.

The MX-functional nanoparticles, and the nanoparticles may independently have a largest dimension or average largest dimension less than 50, less than 20, less than 10, or less than 5, nm. Optionally the nanoparticles include a largest dimension of greater than 0.1 nm. Furthermore, the largest dimension or average largest dimension of the nanoparticles may be between 1 and 50, between 2 and 50, between 2 and 20, between 2 and 10, or between 2.2 and 4.7, nm. The largest dimension of the nanoparticles can be measured by a variety of methods, such as with a transmission electron microscope (TEM). For example, as understood in the art, particle size distributions are often calculated via TEM image analysis of hundreds of different nanoparticles. In various embodiments, the nanoparticles may comprise quantum dots, typically silicon quantum dots. Quantum dots have excitons confined in all three spatial dimensions and may comprise individual crystals, i.e., each quantum dot is a single crystal.

In various embodiments, the nanoparticles may be photoluminescent when excited by exposure to UV light. Depending on the average diameter of the nanoparticles, the nanoparticles may photoluminescence in any of the wavelengths in the visible spectrum and may visually appear to be red, orange, green, blue, violet, or any other color in the visible spectrum. For example, when the nanoparticles have an average diameter of less than 5 nm, visible photoluminescence may be observed, and when the nanoparticles have an average diameter less than 10 nm near infrared (IR) luminescence may be observed. In one form of the present disclosure, the nanoparticles have a photoluminescent intensity of at least $1 \times 10^6$ at an excitation wavelength of 365 nm. The photoluminescent intensity may be measured with a Fluorolog3 spectrofluorometer (commercially available from Horiba of Edison, NJ) with a 450 W Xe excitation source, excitation monochromator, sample holder, edge band filter (400 nm), emission monochromator, and a silicon detector photomultiplier tube. To measure photoluminescent intensity, the excitation and emission slit width are set to 2 nm and the integration time is set to 0.1 s. In these or other embodiments, the silicon nanoparticles may have a quantum efficiency of at least 4% at an excitation wavelength of 395 nm as measured on an HR400 spectrophotometer (commercially available from Ocean Optics of Dunedin, Florida) via a 1000 micron optical fiber coupled to an integrating sphere and the spectrophotometer with an absorption of >10% of the incident photons. Quantum efficiency is calculated by placing a sample into the integrating sphere and exciting the sample via a 395 nm LED driven by an Ocean Optics LED driver. The system was calibrated with a known lamp source to measure absolute irradiance from the integrating sphere. The quantum efficiency is then calculated by the ratio of total photons emitted by the nanoparticles to the total photons absorbed by the nanoparticles. Further, in these or other embodiments, the nanoparticles may have a full width at half maximum emission of from 20 to 250 at an excitation wavelength of 270-500 nm.

Without wishing to be bound to a particular theory, photoluminescence of the silicon nanoparticles is thought to be caused by a quantum confinement effect that occurs when the diameter of the silicon nanoparticles is smaller than the excitation radius, which results in bandgap bending (i.e., increasing of the gap). The bandgap energy of a nanoparticle changes as a function of the diameter of the nanoparticle. Although silicon is an indirect bandgap semiconductor in bulk, silicon nanoparticles with diameters of less than 5 nm emulate a direct bandgap material, which is made possible by interface trapping of excitons.

Furthermore, both the photoluminescent intensity and luminescent quantum efficiency may continue to increase over time, particularly when the nanoparticles are exposed to air to passivate surfaces of the nanoparticles. In another form of the present disclosure, the maximum emission wavelength of the nanoparticles shifts to shorter wavelengths (i.e., a blue-shift of an emission spectrum) over time when passivated (e.g., being exposed to oxygen). The luminescent quantum efficiency of the nanoparticles may be increased by 200% to 2500% upon passivation. However, other increases in the luminescent quantum efficiency are also contemplated. The photoluminescent intensity may increase from 400 to 4500% depending on time extent of passivation and concentration of the nanoparticles in a fluid in which they are suspended. However, other increases in the photoluminescent intensity are also contemplated. The wavelength spectrum for light emitted from the nanoparticles experiences a blue shift with passivation of the nanoparticles. In one form of the present disclosure, a maximum emission wavelength undergoes a blue-shift of 100 nm, corresponding to an approximately 1 nm decrease in nanoparticle size, depending on time duration of passivation. However, other maximum emission wavelength shifts are also contemplated herein. Alternative means of passivation include contacting the silicon nanoparticles with a nitrogen-containing gas such as ammonia to create a surface layer on the silicon nanoparticles where the surface layer comprises nitride.

The following examples, illustrating the compositions and methods of this disclosure, are intended to illustrate and not to limit the disclosure.

Example 1: Preparation of MX-Functional Nanoparticles

Silicon nanoparticles are synthesized from a very high frequency (VHF) low pressure plasma system. Ultra-high purity precursor gases (Ar, $H_2$, $SiH_4$, and $Cl_2$) are introduced into a quartz discharge tube (the reaction chamber) via mass flow controllers at a specific ratio and pressure. Typical pressures within the quartz discharge tube are from 1 to 5 Torr.

The gases are then dissociated via a very high frequency plasma discharge (100-150 MHz) to ignite a plasma. The VHF is chosen to maximize plasma coupling while minimizing drive amplitude of a function generator that provides a sinusoidal signal to a Class A radio frequency amplifier.

Silicon atoms coalesce, nucleate, and grow to form silicon nanocrystals (alternatively referred to as silicon nanoparticles) in the plasma discharge. The power of the plasma discharge controls the temperature of individual silicon nanocrystals to allow for control of crystallinity of the silicon nanocrystals. Higher power yields crystalline silicon nanocrystals, while lower power produces amorphous silicon nanocrystals.

Concentration of silicon atoms and residence time of silicon atoms within the plasma discharge (plasma residence time) control the size of the silicon nanoparticles. Once the silicon nanoparticles leave the plasma discharge, via the orifice located at the bottom of the quartz discharge tube (alternatively referred to as a quartz plasma chamber), the silicon nanoparticles no longer grow.

The silicon nanoparticles exit the plasma discharge with $SiH_x$ ($x<4$), radicals (dangling bonds), and/or halogen species (if present in the quartz discharge tube) on the surface of the nanoparticles. The silicon nanoparticles exit through the orifice driven by a large pressure drop into the deposition chamber. The pressure of the deposition chamber is $<1\times10^{-5}$ Torr (produced by a high vacuum pump; for example, a turbo-molecular, cryogenic, or diffusion pump). The large pressure drop creates a supersonic jet of particles streaming out of the plasma chamber. The supersonic jet minimizes any interactions between gas-entrained silicon nanoparticles, thus keeping the silicon nanoparticles monodispersed in a gas stream.

An agitated capture fluid (a low viscosity liquid having a viscosity of less than 0.2 Pa·s) is disposed in a cup and is used to capture the silicon nanoparticles at a low pressure ($<1\times10^{-5}$ Torr) in the deposition chamber. The location of a surface of the capture fluid is located within a distance of the orifice sufficient to ensure that the silicon nanoparticles remain dispersed in a supersonic jet of gas prior to being deposited within the capture fluid. The capture fluid has a low viscosity to allow the silicon nanoparticles to be deposited or injected into the capture fluid without forming a film on the surface of the capture fluid. Agitation of the capture fluid is used to refresh the surface of the capture fluid and force silicon nanoparticles deposited within the capture fluid away from a centerline of the orifice.

The capture fluid and silicon nanoparticles dispersed therein are placed into a temperature-humidity oven (typically 60° C. and 85% relative humidity) for 24 hours to passivate surfaces of the particles with a diffusion-limited oxide ($SiO_x$, $x>2$). This passivation blue-shifts emission spectra and increases the photoluminescent intensity.

Once the silicon nanoparticles are deposited in (i.e., absorbed by) the capture fluid, the capture fluid with the silicon nanoparticles dispersed therein (i.e., the sample) is removed from the deposition chamber and a photoluminescence spectrum is measured. This measurement is performed using a Horiba FL3 spectrofluorometer with a 450 watt Xenon source. An excitation monochromator is set to 365 nm with a slit width of 2 nm. A 400 nm edge filter is placed in a beam path leading to an emission monochromator, downstream of the sample.

The sample (i.e., silicon nanoparticles dispersed in the capture fluid), is placed in a 1 cm path length cuvette (comprising either quartz or methylacrylate). A photoluminescence spectrum (alternatively referred to as an emission spectrum) is measured at a right angle relative to the excitation beam (or at a 22.5° angle—front facing, if the sample is not transparent enough to allow a right angle measurement).

An emission monochromator has a 2 nm slit width and measurements are performed with an integration time of 0.1 s per wavelength and measured every 1 nm. Spectra are corrected for quantum yield of an emission detector.

Example 2: Synthesis of Polar Aprotic Fluid (Tetraethylene Glycol Dialkyl Ether)

A 50 wt % NaOH aqueous solution is added to a solution of tetraethylene glycol in THF over ice. A 2.5× molar quantity of an alkyl bromide is added dropwise to the solution with continuous stirring to form a mixture, which is then allowed to rise to room temperature over 12-24 hours. Diethyl ether is then added to the mixture and the mixture is phase-separated. The organic layer is washed with several aliquots of a 1M aqueous solution of NaCl and then dried with $MgSO_4$. The dried organic layer is then concentrated using a rotary evaporator to remove volatiles to give a crude product mixture, which is then fractionated via high-vacuum distillation apparatus to isolate a purified reaction product comprising tetraethylene glycol dialkyl ether.

Example 3: Functionalization of Silicon Nanoparticles Using a Polar Pendant Precursor as the Functionalization Compound MX-Functional Nanoparticles are prepared according to the procedure of Example 1, with a duration of 30 minutes, where the capture fluid is Capture Fluid 1. The MX-functional nanoparticles are prepared according to the method described supra and for a duration of 30 minutes. The MX-functional nanoparticle suspension is sonicated for 1 hour. The mixture is heated to 160° C. for 2 hours (thermal treatment) to promote hydrosilylation and to yield functionalized nanoparticles. The mixture is cooled and force-aged in a humidity chamber (i.e., passivated) according to the conditions described supra. Most of the capture fluid is removed by washing the functionalized nanoparticles three times with hexane. The functionalized nanoparticles are then contacted with 0.1 mL trifluoroacetic acid (TFA) and stirred in a sample tube for 25 hours. Liquid is removed from the functionalized nanoparticles using a dialysis centrifuge followed by two to three washes with deionized water using centrifugation (i.e., water extraction). The functionalized nanoparticles (which are solid) are resuspended in water.

Capture Fluid 1 is 10 wt % mixture of Functionalization Compound 1 in Polar Aprotic Fluid 1.

Functionalization Compound 1 is a diglycerol ether compound having the formula:

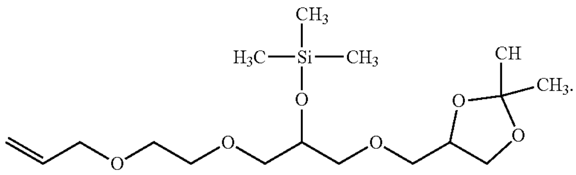 [SMILES: C=CCOCCOCC(COCC1COC(C)(C)O1)O[Si](C)(C)C]

Polar Aprotic Fluid 1 is a capture fluid comprising DHTEG prepared according to Example 2 above.

Photoluminescence emittance of the MX-functional nanoparticles immediately following deposition and suspended in Capture Fluid 1 the functionalized nanoparticles resuspended in water is measured, with the MX-functional nanoparticles undergoing a blue-shift (orange/red to yellow) in emitted photoluminescence as a consequence of being subjected to the functionalization process described herein.

Figure 4:
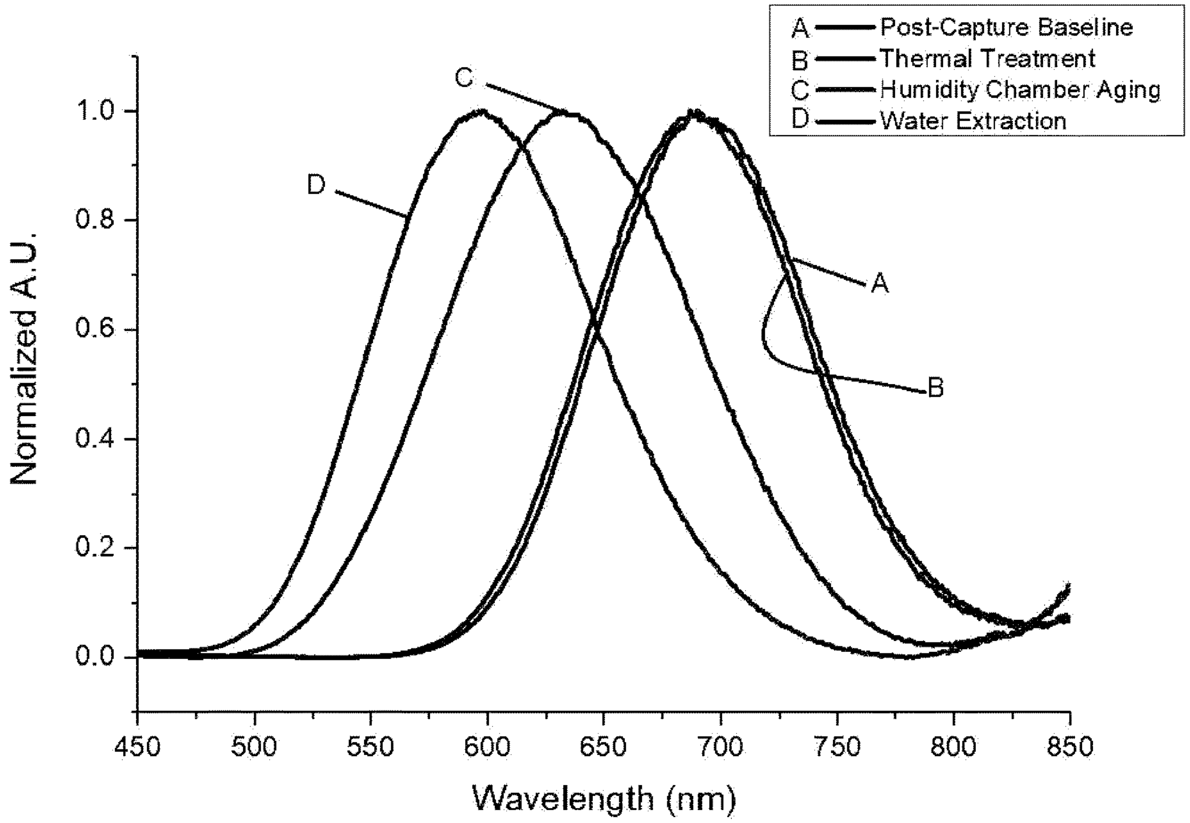
FIG. 4 is a plot of photoluminescent emission spectra of silicon nanoparticles obtained following various stages in the preparation of passivated hydrophilic silicon nanoparticles suspended in water.

FIG. 4 shows a plot of photoluminescence spectra for the nanoparticles following various steps in the functionalization process of the present example. Namely, FIG. 4 plots photoluminescence spectra for the nanoparticles immediately following deposition (post-capture baseline), after hydrosilylation (thermal treatment), after passivation (humidity chamber aging), and after resuspension in water (water extraction). As can be seen from the spectra plotted in FIG. 4, the nanoparticles undergo a blue-shift in photoluminescence as a result of, first, undergoing passivation and, second, undergoing water extraction.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A method for preparing a nanoparticle composition, the method comprising:

forming a nanoparticle aerosol in a low pressure reactor, wherein the aerosol comprises MX-functional nanoparticles entrained in a gas, wherein M is an independently selected Group IV element and X is a functional group independently selected from H and a halogen atom; and collecting the MX-functional nanoparticles of the aerosol in a capture fluid in fluid communication with the low pressure reactor, thereby preparing the nanoparticle composition;

wherein the capture fluid comprises a polar aprotic fluid immiscible with water and having a viscosity of from 5 to 200 centipoise at 25° C., the polar aprotic fluid comprising a tetraethylene glycol dialkyl ether having the formula $R^2$—$[OCH_2CH_2]_nOR^3$, where each of $R^2$ and $R^3$ is an independently selected C5-C8 hydrocarbyl group.

2. The method of claim 1, wherein the capture fluid further comprises a functionalization compound that is miscible with the polar aprotic fluid and comprises a functional group Y reactive with the functional group X of the MX-functional nanoparticles, and wherein the method further comprises reacting the functional group Y of the functionalization compound and the functional group X of the MX-functional nanoparticles to give functionalized nanoparticles.

3. The method according to claim 2, wherein X is H and wherein Y is an aliphatic carbon-carbon multiple bond.

4. The method according to claim 1, wherein X is a halogen atom independently selected from F, Cl, Br, and I.

5. The method of claim 2, wherein the functionalization compound comprises a polar pendant precursor having the formula:

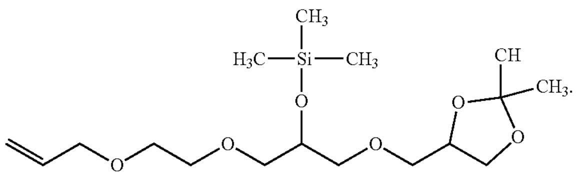 [SMILES: C=CCOCCOCC(COCC1COC(C)(C)O1)O[Si](C)(C)C]

6. The method according to claim 2, wherein the functionalization compound is a polar pendant precursor and further comprises at least one functional group Z in addition to Y with Z being convertible to a hydrophilic functional group, and wherein the method further comprises the step of converting the functional group Z to a hydrophilic functional group.

7. The method according to claim 6, wherein the step of converting the functional group Z to a hydrophilic functional group includes contacting the Z group with a deprotection compound comprising trifluoroacetic acid.

8. The method according to claim 6, wherein the at least one functional group Z convertible to a hydrophilic functional group is selected from an ester functional group, an acid halide functional group, an amide functional group, an acetal functional group, a ketal functional group, a nitrile functional group, a silyl ether functional group, an epoxide functional group, a disulfide functional group, an ethylenically unsaturated group, an oxazoline functional group, an anhydride functional group, and combinations thereof.

9. The method according to claim 2, wherein the functionalization compound further comprises a hydrophilic functional group different from Y and selected from a carboxylic acid functional group, an alcohol functional group, a hydroxy functional group, an azide functional group, a silyl ether functional group, an ether functional group, a phosphonate functional group, a sulfonate functional group, a thiol functional group, an amine functional group, an anhydride functional group, an acetal functional group, a ketal functional group, and combinations thereof.

10. The method according to claim 2, wherein a concentration of the functionalization compound is from 0.01 wt % to 10 wt % measured with respect to the capture fluid.

11. The method according to claim 1, wherein forming the nanoparticle aerosol comprises:

applying a preselected radio frequency having a continuous frequency of from 10 to 500 MHz and a coupled power of from 5 to 1000 W to a reactant gas mixture in the low pressure reactor, the low pressure reactor having a reactant gas inlet and an outlet defining an aperture, to generate a plasma for a time sufficient to form the nanoparticle aerosol comprising MX-functional nanoparticles in a gas;

wherein the reactant gas mixture comprises a first precursor gas containing M, and at least one inert gas.

12. The method according to claim 1, further comprising:

introducing the nanoparticle aerosol into a diffusion pump from the low pressure reactor;

heating the capture fluid in a reservoir to form a vapor and sending the vapor through a jet assembly;

emitting the vapor through a nozzle into a chamber of the diffusion pump and condensing the vapor to form a condensate comprising the capture fluid;

flowing the condensate back to the reservoir; and capturing the MX-functional nanoparticles of the aerosol in the condensate comprising the capture fluid.

13. The method according to claim 1, further comprising separating the nanoparticles and the capture fluid to obtain separated nanoparticles.

14. The method according to claim 13, wherein the separated nanoparticles are a solid.

15. The method according to claim 13, further comprising suspending the separated nanoparticles in a polar solvent selected from water and a dipolar aprotic organic solvent.

16. A nanoparticle composition prepared in accordance with the method of claim 1.

* * * * *